(12) United States Patent
Chaudhari et al.

(10) Patent No.: US 11,834,881 B2
(45) Date of Patent: Dec. 5, 2023

(54) ARTICULATING HINGE ASSEMBLY FOR USE WITH A GAMING MACHINE CABINET

(71) Applicant: ARISTOCRAT TECHNOLOGIES AUSTRALIA PTY LIMITED, North Ryde (AU)

(72) Inventors: Deepak Chaudhari, North Parramatta (AU); Prabhakar Mutukundu, Lidcombe (AU); Muharrem Abali, Meadowbank (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 385 days.

(21) Appl. No.: 17/313,691

(22) Filed: May 6, 2021

(65) Prior Publication Data
US 2021/0254378 A1 Aug. 19, 2021

Related U.S. Application Data

(63) Continuation of application No. 16/585,877, filed on Sep. 27, 2019, now Pat. No. 11,028,625.

(51) Int. Cl.
*E05D 3/16* (2006.01)
*A63F 13/90* (2014.01)
*G07F 17/32* (2006.01)

(52) U.S. Cl.
CPC ............... *E05D 3/16* (2013.01); *A63F 13/90* (2014.09); *G07F 17/3216* (2013.01); *E05D 2003/163* (2013.01); *E05Y 2600/41* (2013.01); *E05Y 2900/606* (2013.01); *E05Y 2900/608* (2013.01); *G07F 17/3211* (2013.01)

(58) Field of Classification Search
CPC .................................. E05D 3/16; A63F 13/90
See application file for complete search history.

(56) References Cited

U.S. PATENT DOCUMENTS

| | | | |
|---|---|---|---|
| 6,068,101 A | 5/2000 | Dickenson | |
| 6,475,087 B1 | 11/2002 | Cole | |
| 8,133,118 B2 | 3/2012 | Borissov | |
| 8,388,454 B2 | 3/2013 | Kido | |
| 9,881,443 B2 | 1/2018 | Maher | |
| 10,181,236 B2 | 1/2019 | Goldstein | |
| 2001/0039762 A1* | 11/2001 | Giovannetti | E05F 1/1091 49/246 |
| 2002/0183106 A1 | 12/2002 | Cole | |
| 2004/0097285 A1 | 5/2004 | Fisher | |

(Continued)

OTHER PUBLICATIONS

Notice of Allowance dated Feb. 22, 2021 for U.S. Appl. No. 16/585,877 (pp. 1-9).

*Primary Examiner* — Reginald A Renwick
(74) *Attorney, Agent, or Firm* — Armstrong Teasdale LLP

(57) ABSTRACT

An electronic gaming machine that includes a cabinet, a display, and a hinge assembly coupled therebetween. The hinge assembly includes a first bracket coupled to the cabinet, a second bracket coupled to the display, and at least four pairs of interdigitated members extending between the first bracket and the second bracket. The hinge assembly is selectively expandable and retractable between a retracted position and an expanded position, and the hinge assembly is configured to swing the display from a lowered position to a raised position as the hinge assembly is expanded from the retracted position to the expanded position.

20 Claims, 14 Drawing Sheets

(56) References Cited

U.S. PATENT DOCUMENTS

| | | |
|---|---|---|
| 2006/0281558 A1 | 12/2006 | Rifkin |
| 2007/0197301 A1* | 8/2007 | Cole ................. G07F 17/32 463/47 |
| 2007/0238531 A1* | 10/2007 | Taxon ............... G07F 17/3216 463/46 |
| 2008/0113820 A1 | 5/2008 | Tedsen |
| 2008/0182642 A1* | 7/2008 | Cole ................. G07F 17/32 463/20 |
| 2009/0124395 A1* | 5/2009 | O'Keene ............ G07F 17/32 463/46 |
| 2016/0335836 A1 | 11/2016 | Castro |
| 2016/0343204 A1* | 11/2016 | Maher ............... E05F 1/1091 |
| 2018/0025575 A1* | 1/2018 | Yukimura ........... H04N 9/3194 463/31 |
| 2018/0081391 A1 | 3/2018 | Mittler |
| 2019/0080553 A1* | 3/2019 | Hohman ............. G07F 17/3216 |
| 2019/0096171 A1 | 3/2019 | Patel |
| 2019/0096173 A1* | 3/2019 | Brandau ............ G07F 17/3223 |
| 2019/0102971 A1 | 4/2019 | Schoonmaker |

* cited by examiner

ARTICULATING HINGE ASSEMBLY FOR USE WITH A GAMING MACHINE CABINET

CROSS-REFERENCE TO RELATED APPLICATION

This application is a continuation of and claims priority to and the benefit of U.S. patent application Ser. No. 16/585,877, filed Sep. 27, 2019, and entitled ARTICULATING HINGE ASSEMBLY FOR USE WITH A GAMING MACHINE CABINET, which is hereby incorporated by reference in its entirety.

TECHNICAL FIELD

The field of disclosure relates generally to electronic gaming, and more particularly, to electronic gaming machines including articulating hinge assemblies for moving doors or displays on gaming machine cabinets.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance. When the player is done, he/she cashes out the credit balance (typically by pressing a cash out button to receive a ticket from the ticket printer). The ticket may be "cashed-in" for money or inserted into another machine to establish a credit balance for play by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The games are designed to return a certain percentage of the amount wagered back to the player, referred to as return to player (RTP), over the course of many plays or instances of a game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

At least some known EGMs are housed in a cabinet, and an interior of the cabinet is accessible through openings covered by doors or by the display of the EGM.

BRIEF DESCRIPTION

In one aspect, an electronic gaming machine is described. The electronic gaming machine includes a cabinet, a display, and a hinge assembly coupled therebetween. The hinge assembly includes a first bracket coupled to the cabinet, a second bracket coupled to the display, and at least four pairs of interdigitated members extending between the first bracket and the second bracket. The hinge assembly is selectively expandable and retractable between a retracted position and an expanded position, and the hinge assembly is configured to swing the display from a lowered position to a raised position as the hinge assembly is expanded from the retracted position to the expanded position.

In another aspect, a hinge assembly is described. The hinge assembly includes a first bracket configured to be coupled to a gaming machine cabinet, a second bracket configured to be coupled to a gaming machine display, and at least four pairs of interdigitated members extending between the first bracket and the second bracket. The hinge assembly is selectively expandable and retractable between a retracted position and an expanded position, and the hinge assembly is configured to swing the display from a lowered position to a raised position as the hinge assembly is expanded from the retracted position to the expanded position.

In yet another aspect, an electronic gaming machine is described. The gaming machine includes a cabinet, a display, and a hinge assembly coupled between the cabinet and the display, The hinge assembly includes a first bracket coupled to the cabinet, a second bracket coupled to the display, and a plurality of interdigitated members extending between the first bracket and the second bracket. The hinge assembly is selectively expandable and retractable between a retracted position and an expanded position. The hinge assembly is configured to reposition the display between a first position and a second position as the hinge assembly is expanded from the retracted position to the expanded position.

BRIEF DESCRIPTION OF THE DRAWINGS

An example embodiment of the subject matter disclosed will now be described with reference to the accompanying drawings.

DETAILED DESCRIPTION

Embodiments of the present disclosure include electronic gaming machines (EGMs) including articulating hinge assemblies for moving cabinet access doors or video screen displays on gaming machine cabinets. The EGM described herein includes a cabinet and a display screen (also referred to herein as a display) connected to the cabinet with the hinge assembly. The hinge assembly includes a plurality of interdigitated members (i.e., link pairs) coupled to each other by a plurality of fasteners to define a plurality of pivot points. The pivot points facilitate articulation (e.g., expansion and retraction) of the hinge assembly, which enables the display to be opened and closed to provide access to an interior of the cabinet.

In one embodiment, the display is connected to a top edge of the cabinet, and an upper portion of the display is proximate to the top edge. The hinge assembly described herein provides a range of motion that allows the display to swing away from the cabinet, and to avoid contact between the upper portion of the display and the cabinet as the display is opened and closed. The range of motion may be defined by tracing the movement of at least one of the pivot points that are movable relative to the cabinet. For example, when the display is moved from a closed position to an open position, the mobile pivot points move downward and outward from the cabinet until an apex is reached, and then move upward and outward relative to the apex until the display reaches the open position. The radius of curvature of the downward range of motion progressively increases as the pivot points move towards to apex, and the radius of curvature of the upward range of motion progressively decreases as the pivot points move away from the apex. In other words, the downward range of motion is initially substantially linear and becomes arcuate at the apex, and the upward range of motion is initially arcuate at the apex and becomes substantially linear. As such, the parabolic range of motion defined by the hinge assembly facilitates ensuring the display does not contact the cabinet throughout the opening and closing motions. Accordingly, the hinge assembly described herein facilitates preventing damage and/or abrasion from being incurred to the cabinet and the display.

Figure 1:
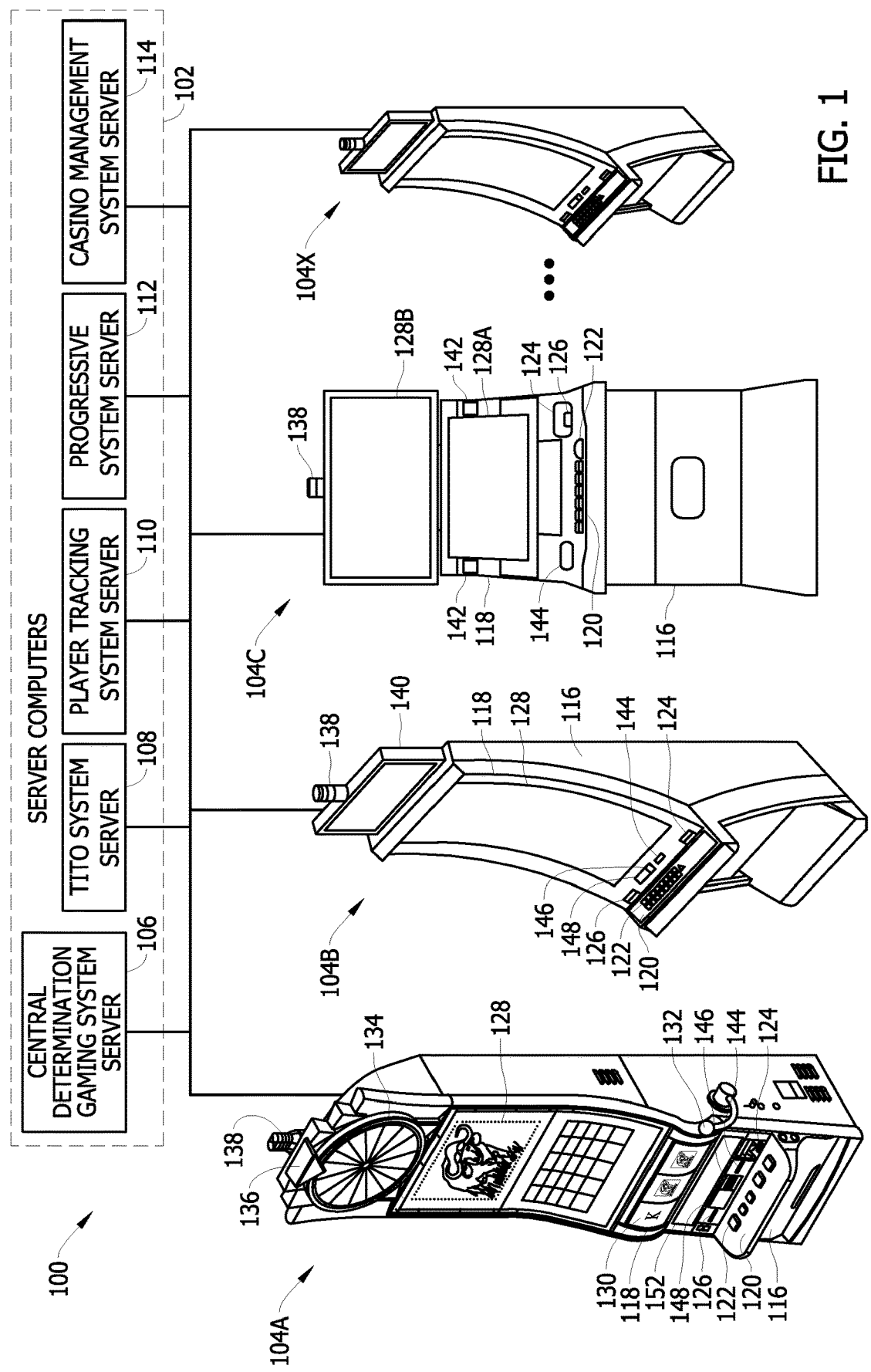
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. In some embodiments central determination gaming server 106 may be a bingo gaming system server. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
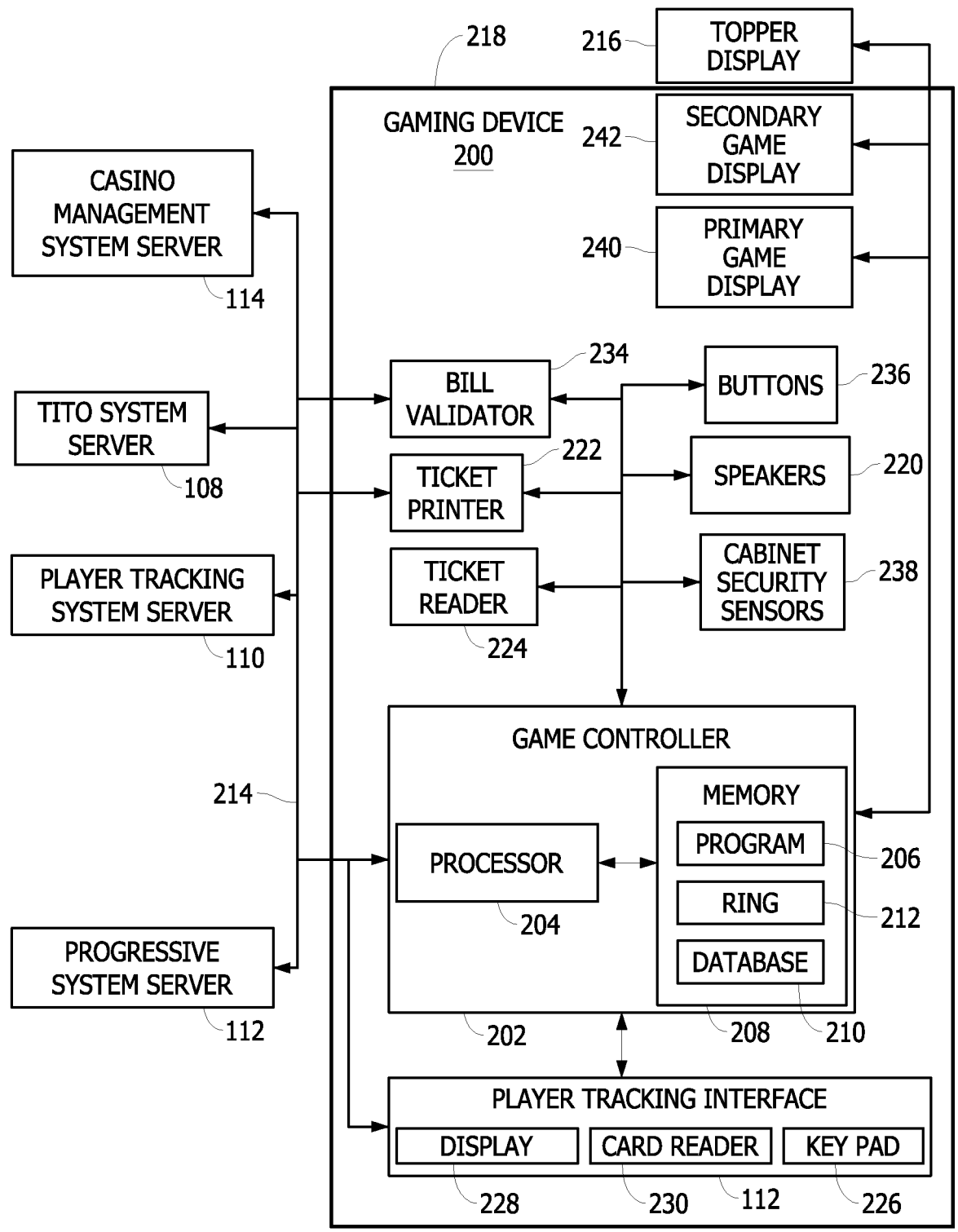
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, the gaming device 200 may include a topper display 216 or another form of a top box (e.g., a topper wheel, a topper screen, etc.) that sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and non-volatile memory and other types of non-transitory data storage components. Volatile memory is memory that do not retain data values upon loss of power. Non-volatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2 illustrates that game controller 202 includes a single memory 208, game controller 202 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game instances based on instructions and/or data that gaming device 200 exchange with one or more remote gaming devices, such as a central determination gaming system server 106 (not shown in FIG. 2 but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes an RNG 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 3:
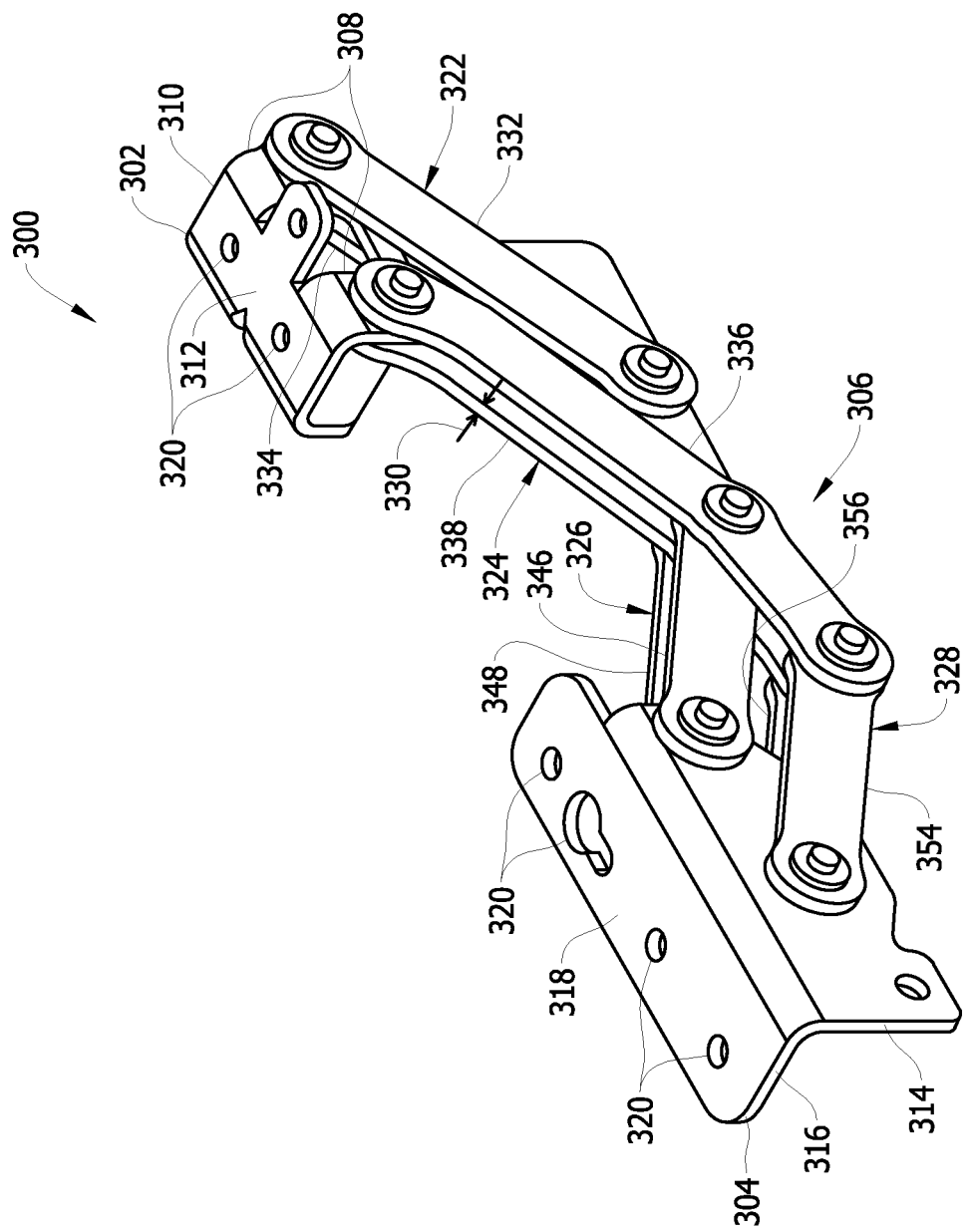
FIG. 3 is a perspective view of an example hinge assembly that may be used with at least one of the EGMs shown in FIG. 1.
Figure 4:
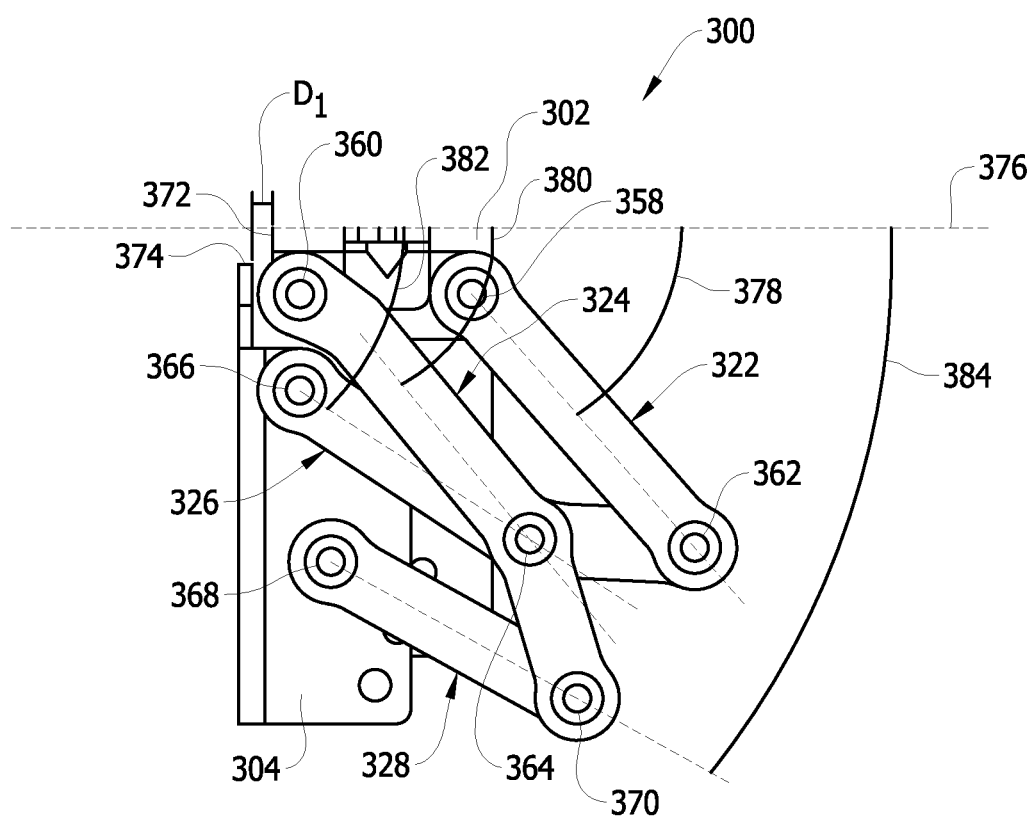
FIG. 4 is a side view of the hinge assembly shown in FIG. 3, the hinge assembly shown in a fully retracted position.
Figure 5:
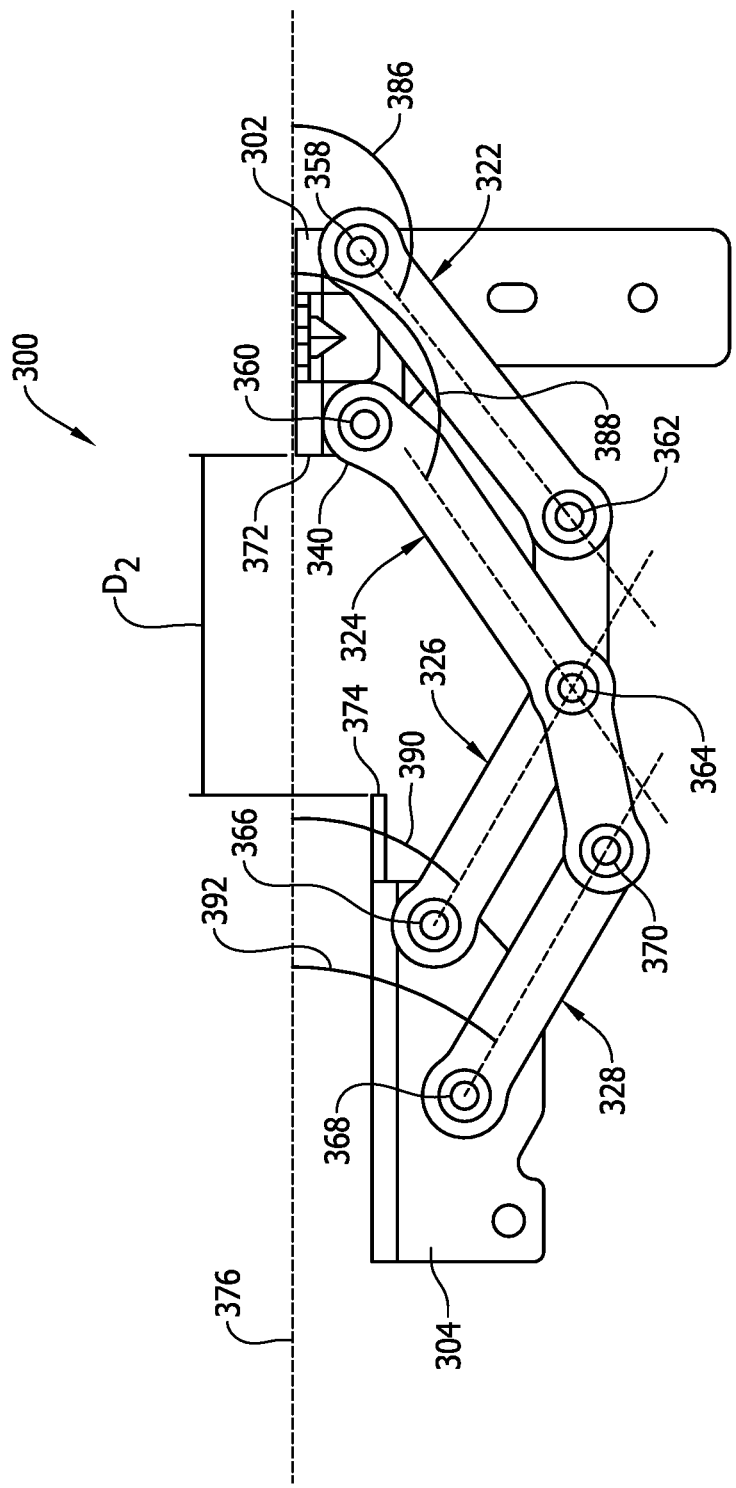
FIG. 5 is a side view of the hinge assembly shown in FIG. 3, the hinge assembly shown in a fully expanded position.

FIG. 3-5 illustrate various views of an example hinge assembly 300 that may be used with at least one of the gaming devices 104A-104X such as, but not limited to, gaming device 104B (shown in FIG. 1). In the example embodiment, hinge assembly 300 includes a first bracket 302, a second bracket 304, and a linkage system 306 coupled to and extending between first bracket 302 and second bracket 304. First bracket 302 includes a first portion 308 and a second portion 310 oriented orthogonally relative to first portion 308. First portion 308 is coupled to linkage system 306, and second portion 310 includes a first mounting surface 312 for coupling to one or more components of gaming devices 104A-104X. Second bracket 304 includes a first portion 314 and a second portion 316 oriented orthogonally relative to first portion 314. First portion 314 is coupled to linkage system 306, and second portion 316 includes a second mounting surface 318 for coupling to one or more components of gaming devices 104A-104X. Second portion 310 and second portion 316 each include mounting holes 320 defined therein, and may be coupled to the one or more components of gaming devices 104A-104X with one or more fasteners, such as rivets, bolts, screws, and the like.

In general, linkage system 306 includes a plurality of interconnected pairs of links (or "link pairs") coupled between first bracket 302 and second bracket 304. Each link pair includes at least one elongated member (or "link member") coupled through at least one pivot joint to another elongated member. Link pairs are coupled or interconnected to one another at one or more pivot points by interleaving, interlocking, and/or interdigitating the link members of one link pair with the link members of another link pair. Further, in the example embodiment, each pivot point includes a fastener, such as a rivet, arranged to rotatably couple link pairs, one to another, or to one of first bracket 302 or second bracket 304. The use of rivets to couple link pairs may reduce or eliminate lateral flex in hinge assembly 300, such that each of the link pairs are maintained in a stable relationship to one another. It will be appreciated, however, that other types of fasteners may be implemented in hinge assembly 300, such as, for example, and without limitation, one or more screws, one or more bolts, and the like. In addition, in some embodiments, one or more flattened or low profile rivets may be used, such as, for example, to make hinge assembly 300 more compact.

In the example embodiment, linkage system 306 includes a first link pair 322, a second link pair 324, a third link pair 326, and a fourth link pair 328. Link pairs 322, 324, 326, and 328 may be interdigitated with one another, and/or with first bracket 302 or second bracket 304, to achieve an interconnected arrangement of link pairs. To this end, the individual links of each of link pairs 322, 324, 326, and 328 may be of substantially identical thickness. For convenience, the thickness of a link is referred to herein as "link thickness," such as a link thickness 330 shown in FIG. 3. To accommodate interdigitation between one of link pairs 322, 324, 326, and 328 and first bracket 302 or second bracket 304, the thicknesses of second portion 310 and second portion 316 may be substantially equal to the link thickness. In addition, each of the two links in each link pair 322, 324, 326, and 328 may be spaced apart from one another by the link thickness, such that one link of one link pair 322, 324, 326, and 328 may be interdigitated with the two links of another link pair 322, 324, 326, and 328, and/or with first bracket 302 or second bracket 304.

Figure 6:
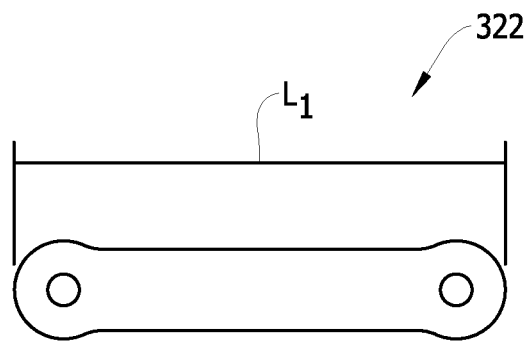
FIG. 6 is a side view of the first link pair shown in FIGS. 3-5.

First link pair 322 includes a first link member 332 and a second link member 334 that are substantially identical, and that have a substantially linear shape. In addition, referring to FIG. 6, first link pair 322 has an overall length $L_1$.

Figure 7:
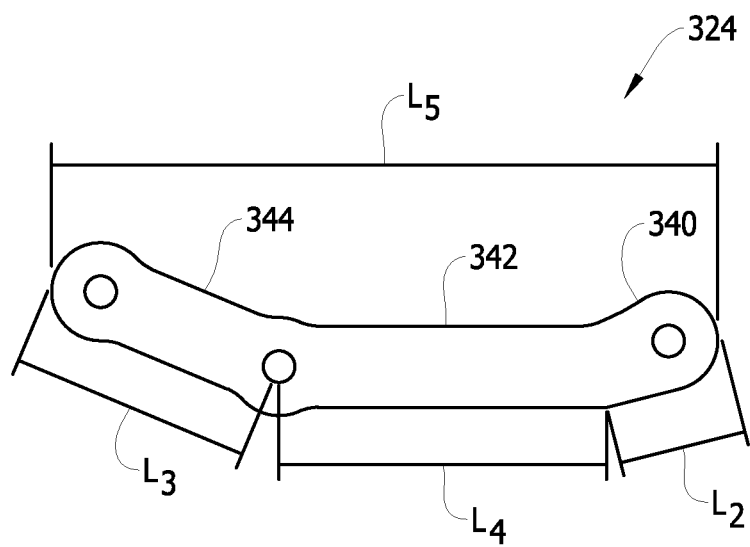
FIG. 7 is a side view of the second link pair shown in FIGS. 3-5.

Second link pair 324 includes a first link member 336 and a second link member 338 that are substantially identical, and that have an oblique shape. Referring to FIG. 7, second link pair 324 includes a first section 340, a second section 342, and a third section 344. First section 340 is oriented obtusely relative to second section 342, such as by an angle defined within a range between about 140 and about 180 degrees, between about 150 and about 170 degrees, or that is approximately 160 degrees. Second section 342 is oriented obtusely relative to third section 344, such as by an angle between about 140 and about 180 degrees, between about 150 and about 170 degrees, or that is approximately 157 degrees. First section 340 has a length $L_2$, third section 344 has a length $L_3$ that is longer than length $L_2$, and second section 342 has a length $L_4$ that is longer than length $L_3$. In addition, second link pair 324 has an overall length $L_5$ that is longer than length $L_1$.

Figure 8:
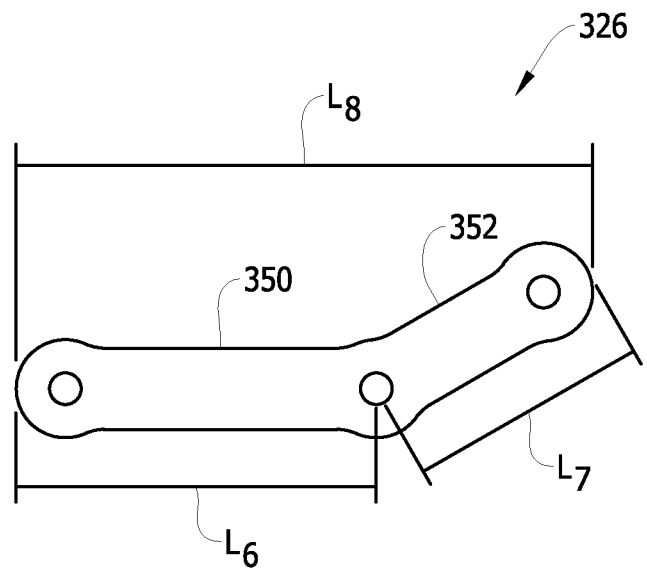
FIG. 8 is a side view of the third link pair shown in FIGS. 3-5.

Third link pair 326 includes a first link member 346 and a second link member 348 that are substantially identical, and that have an oblique shape. Referring to FIG. 8, third link pair 326 includes a first section 350 and a second section 352 oriented obtusely relative to first section 350, such as by an angle defined within a range between about 130 degrees and about 180 degrees, defined within a range between about 140 degrees and about 160 degrees, or that is approximately 150 degrees. First section 350 has a length $L_6$, and second section 352 has a length $L_7$ that is shorter than length $L_6$. In addition, third link pair 326 has an overall length $L_8$ that is shorter than length $L_5$.

Figure 9:
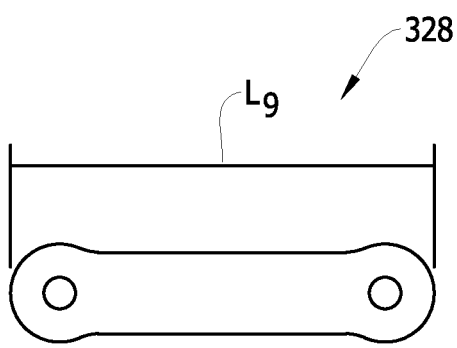
FIG. 9 is a side view of the fourth link pair shown in FIGS. 3-5.

Fourth link pair 328 includes a first link member 354 and a second link member 356 that are substantially identical, and that have a substantially linear shape. In addition, referring to FIG. 9, fourth link pair 328 has an overall length $L_9$ that is shorter than length $L_1$.

First link pair 322 is coupled to and extends from first bracket 302 at a first pivot point 358, and second link pair is coupled to and extends from first bracket 302 at a second pivot point 360. Third link pair 326 is coupled to first link pair 322 at a third pivot point 362, is coupled to second link pair 324 at a fourth pivot point 364, and is coupled to second bracket 304 at a fifth pivot point 366. Fourth link pair 328 is coupled to and extends from second bracket 304 at a sixth pivot point 368, and is coupled to second link pair 324 at a seventh pivot point 370. Accordingly, hinge assembly 300 is selectively expandable and retractable between a fully retracted position (shown in FIG. 4) and a fully expanded position (shown in FIGS. 3 and 5). When in the fully retracted position, first mounting surface 312 and second mounting surface 318 are oriented substantially perpendicular to each other. When in the fully expanded position, first mounting surface 312 and second mounting surface 318 are oriented substantially parallel with each other. As such, as will be described in more detail below, hinge assembly 300 has a range of motion that enables main display 128 (shown in FIG. 1) to be swung from a lowered position to a raised position to provide access to main cabinet 116 (shown in FIG. 1).

In addition, hinge assembly 300 has a range of motion that progressively increases a distance between first bracket 302 and second bracket 304 as hinge assembly 300 is expanded from the fully retracted position to the fully expanded position. For example, first bracket 302 includes a first proximal edge 372, and second bracket 304 includes a second proximal edge 374. Referring to FIG. 3, when in the fully retracted position, a distance $D_1$ is defined between first proximal edge 372 and second proximal edge 374. Referring to FIG. 4, when in the fully expanded position, a distance $D_2$ is defined between first proximal edge 372 and second proximal edge 374. Distance $D_2$ is greater than distance $D_1$. Accordingly, sufficient clearance is provided between main cabinet 116 and main display 128 as main display 128 is rotated from a vertical orientation to a horizontal orientation by hinge assembly 300, as will be described in more detail below.

In the example embodiment, a plurality of predefined angles are defined between a reference axis 376 and link pairs 322, 324, 326, and 328 when hinge assembly 300 is in the fully retracted position or the fully expanded position. The predefined angles are defined as a function of the dimensions of each link pair 322, 324, 326, and 328, and as a function of the location of pivot points 358, 360, 362, 364, 366, 368, and 370.

For example, referring to FIG. 4, a first angle 378 is defined between reference axis 376 and first link pair 322. First angle 378 is defined within a range between about 30 degrees and about 60 degrees, or between about 40 degrees and about 50 degrees. A second angle 380 is defined between reference axis 376 and second section 342 of second link pair 324. Second angle 380 is defined within a range between about 30 degrees and about 60 degrees, or between about 40 degrees and about 50 degrees. A third angle 382 is defined between reference axis 376 and first section 340 of third link pair 326. Third angle 382 is defined within a range between about 25 degrees and about 55 degrees, or between about 35 degrees and about 45 degrees. A fourth angle 384 is defined between reference axis 376 and fourth link pair 328. Fourth angle 384 is defined within a range between about 25 degrees and about 55 degrees, or between about 35 degrees and about 45 degrees.

Referring to FIG. 5, a first angle 386 is defined between reference axis 376 and first link pair 322. First angle 386 is defined within a range between about 120 degrees and about 150 degrees, or between about 130 degrees and about 140 degrees. A second angle 388 is defined between reference axis 376 and second section 342 of second link pair 324. Second angle 388 is defined within a range between about 120 degrees and about 150 degrees, or between about 130 degrees and about 140 degrees. A third angle 390 is defined between reference axis 376 and first section 340 of third link pair 326. Third angle 390 is defined within a range between about 20 degrees and about 50 degrees, or between about 30 degrees and about 40 degrees. A fourth angle 392 is defined between reference axis 376 and fourth link pair 328. Fourth angle 392 is defined within a range between about 20 degrees and about 50 degrees, or between about 30 degrees and about 40 degrees.

Figure 10:
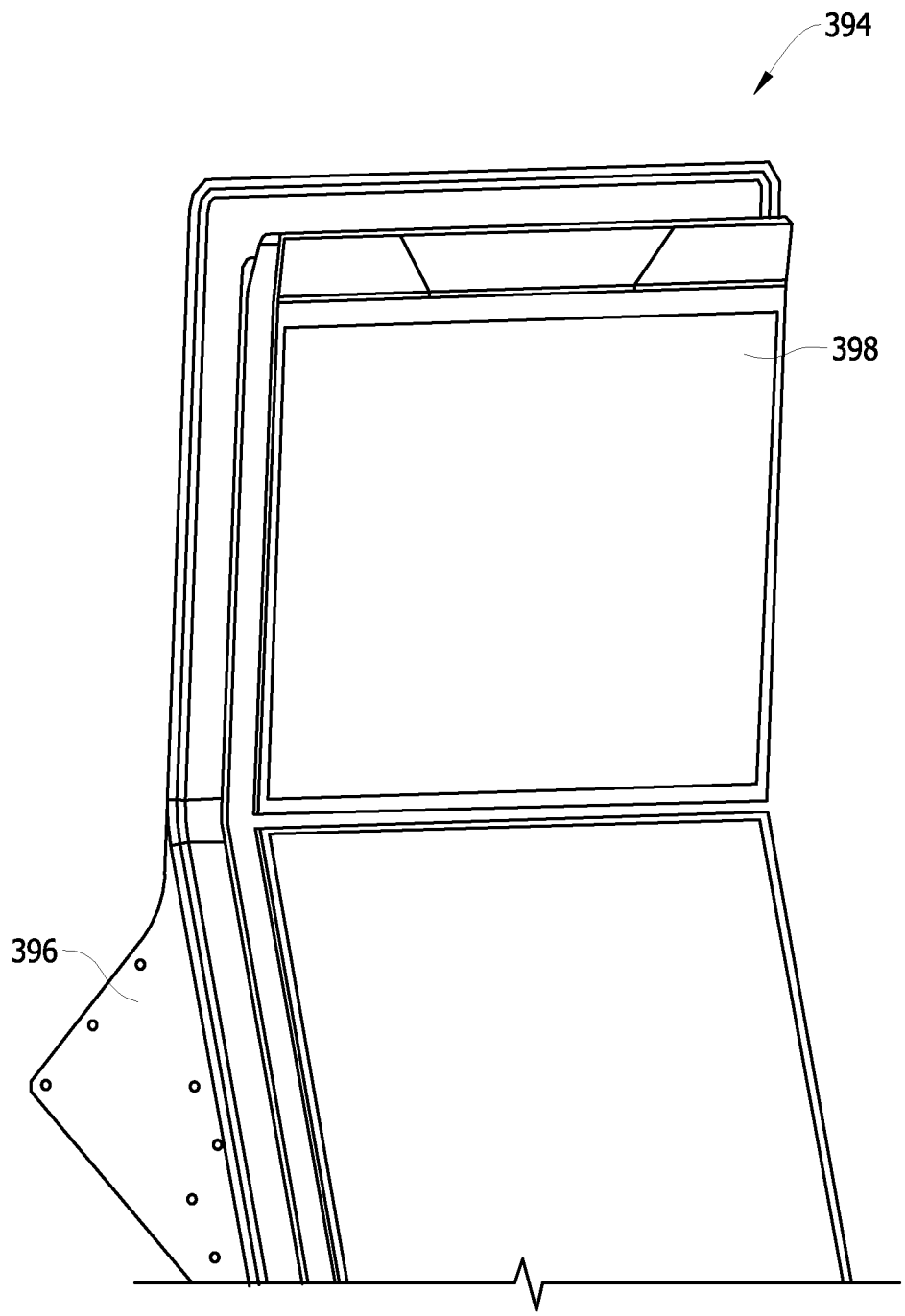
FIG. 10 is a perspective view of an example cabinet assembly that may be used with at least one of the EGMs shown in FIG. 1, the cabinet assembly including an example display shown in a closed position.
Figure 11:
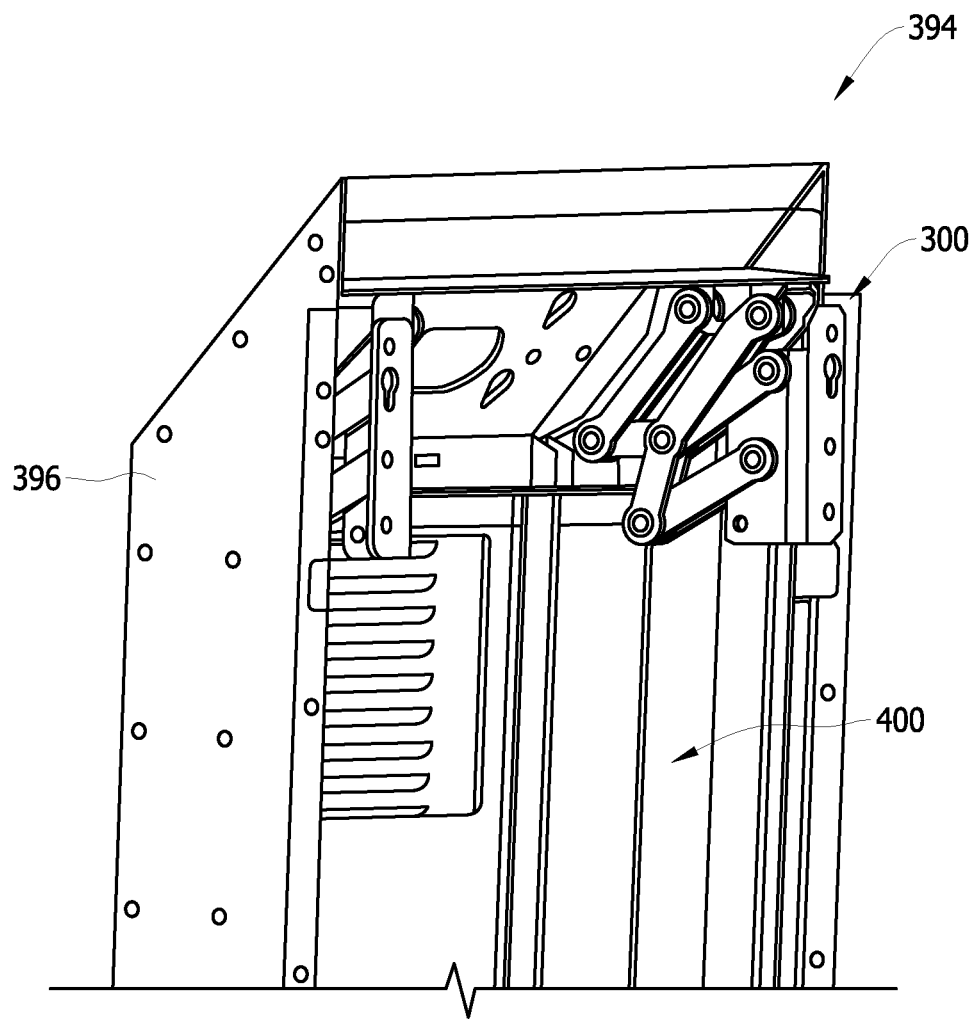
FIG. 11 is a perspective view of the cabinet assembly shown in FIG. 10 having the display removed for clarity.
Figure 12:
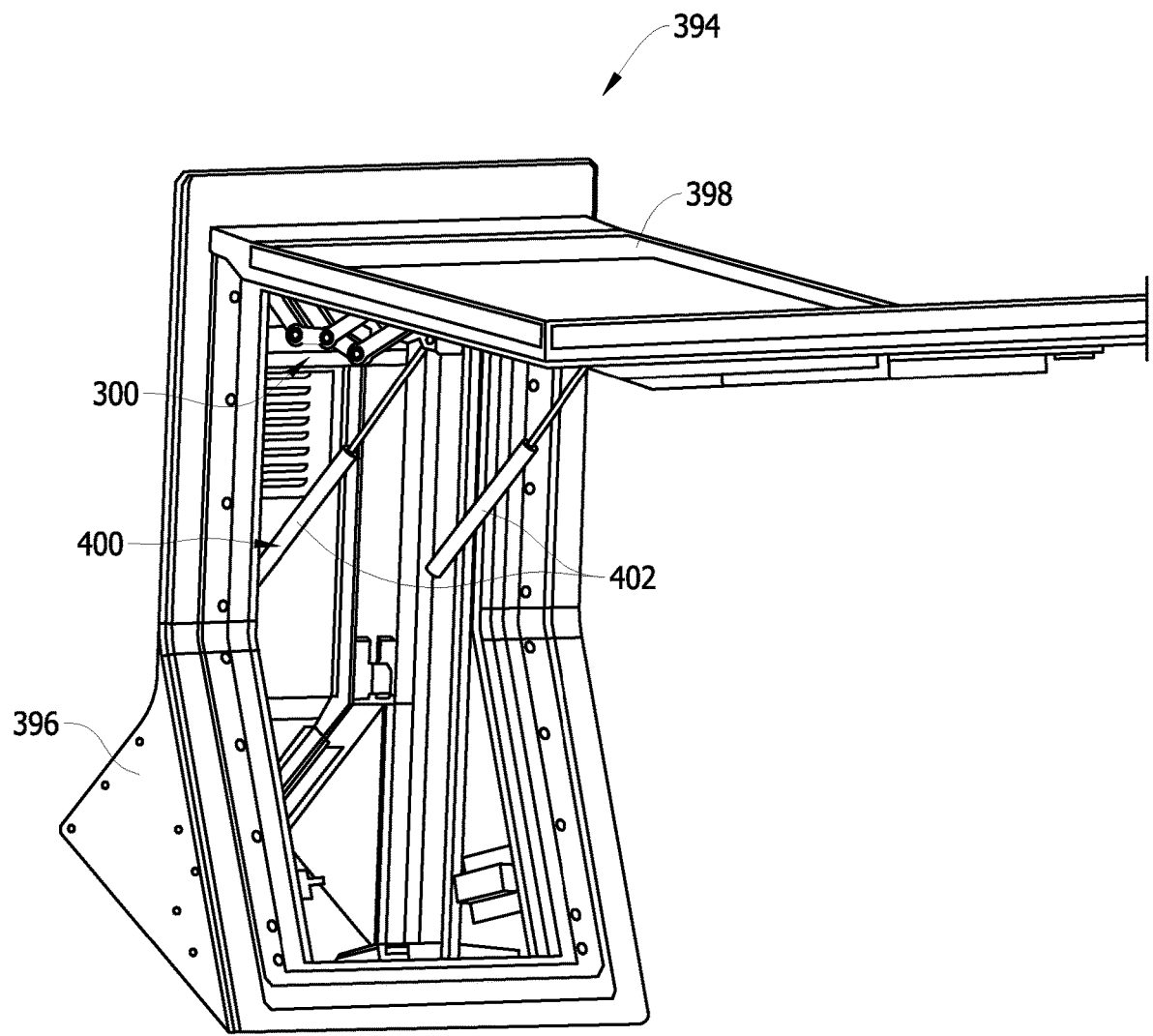
FIG. 12 is a perspective view of the cabinet assembly shown in FIG. 10 having the display shown in a fully open position.
Figure 13:
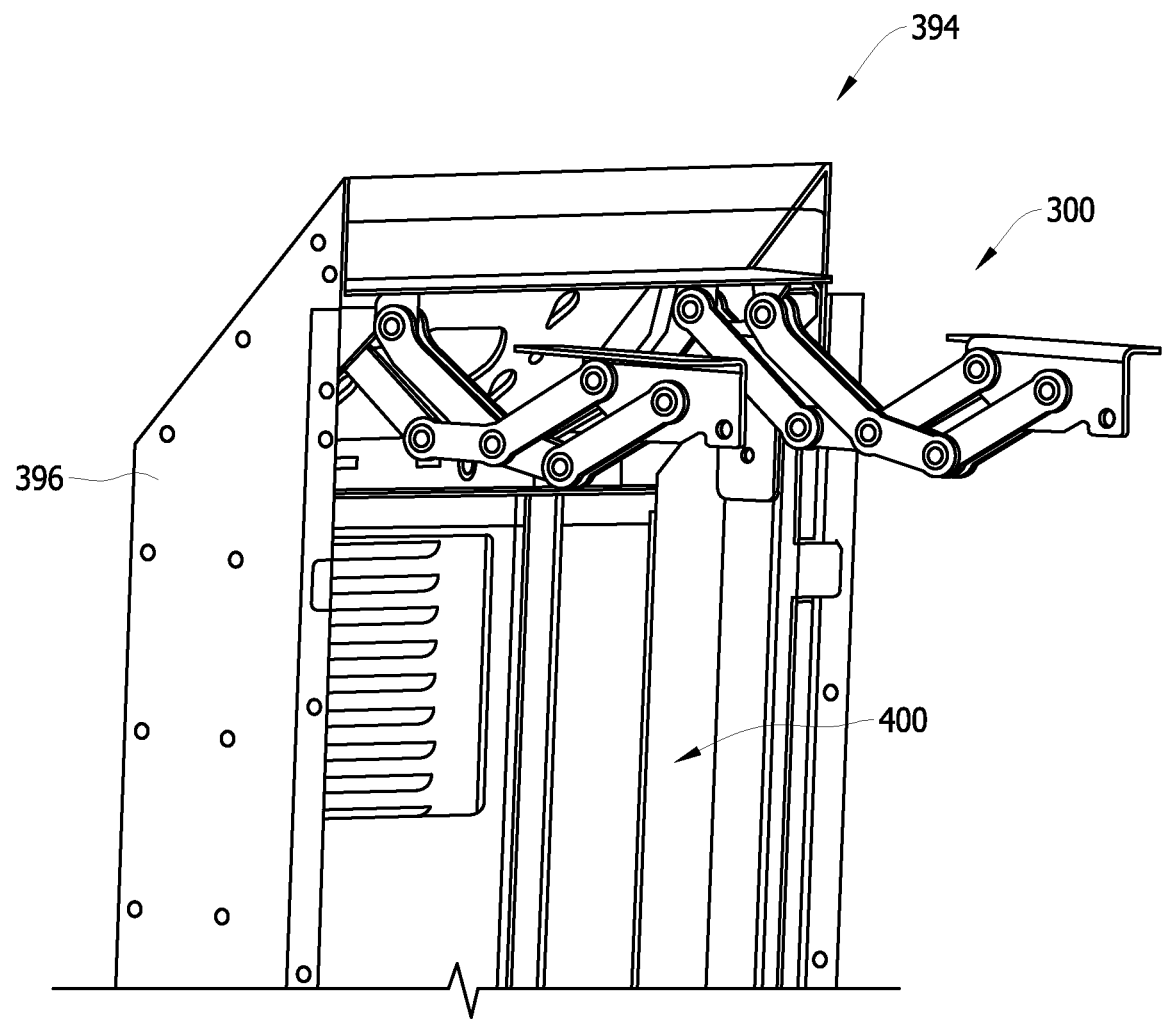
FIG. 13 is a perspective view of the cabinet assembly shown in FIG. 12 having the display removed for clarity.

FIGS. 10-13 are views of an example cabinet assembly 394 that may be used with at least one of the gaming devices 104A-104X such as, but not limited to, gaming device 104B (shown in FIG. 1). In the example embodiment, cabinet assembly 394 includes a cabinet frame 396 of main cabinet 116 (shown in FIG. 1) (collectively referred to herein as "cabinet") and a display screen 398 of main display 128 (shown in FIG. 1) (collectively referred to herein as "display"). Hinge assembly 300 is coupled between cabinet frame 396 and display screen 398. Referring to FIGS. 10 and 11, hinge assembly 300 is in the fully retracted position, which causes display screen 398 to be in a closed or lowered position relative to cabinet frame 396. Display screen 398 is oriented substantially vertically when in the closed or lowered position. Referring to FIGS. 12 and 13, hinge assembly 300 is in the fully expanded position, which causes display screen 398 to be in an open or raised position relative to cabinet frame 396 to provide access to an interior 400 of cabinet frame 396. Display screen 398 is oriented substantially horizontally when in the open or raised position. In addition, in one embodiment, a biasing mechanism 402, such as a gas spring, is coupled between cabinet frame 396 and display screen 398 to facilitate holding display screen 398 in the open or raised position.

The range of motion of hinge assembly 300 may be delimited in any manner that enables cabinet assembly 394 to function as described herein. In one embodiment, the range of motion is delimited by the maximum length of extension of biasing mechanism 402. Alternatively, the range of motion may be delimited through contact between links pairs 322 and 324.

Figure 14:
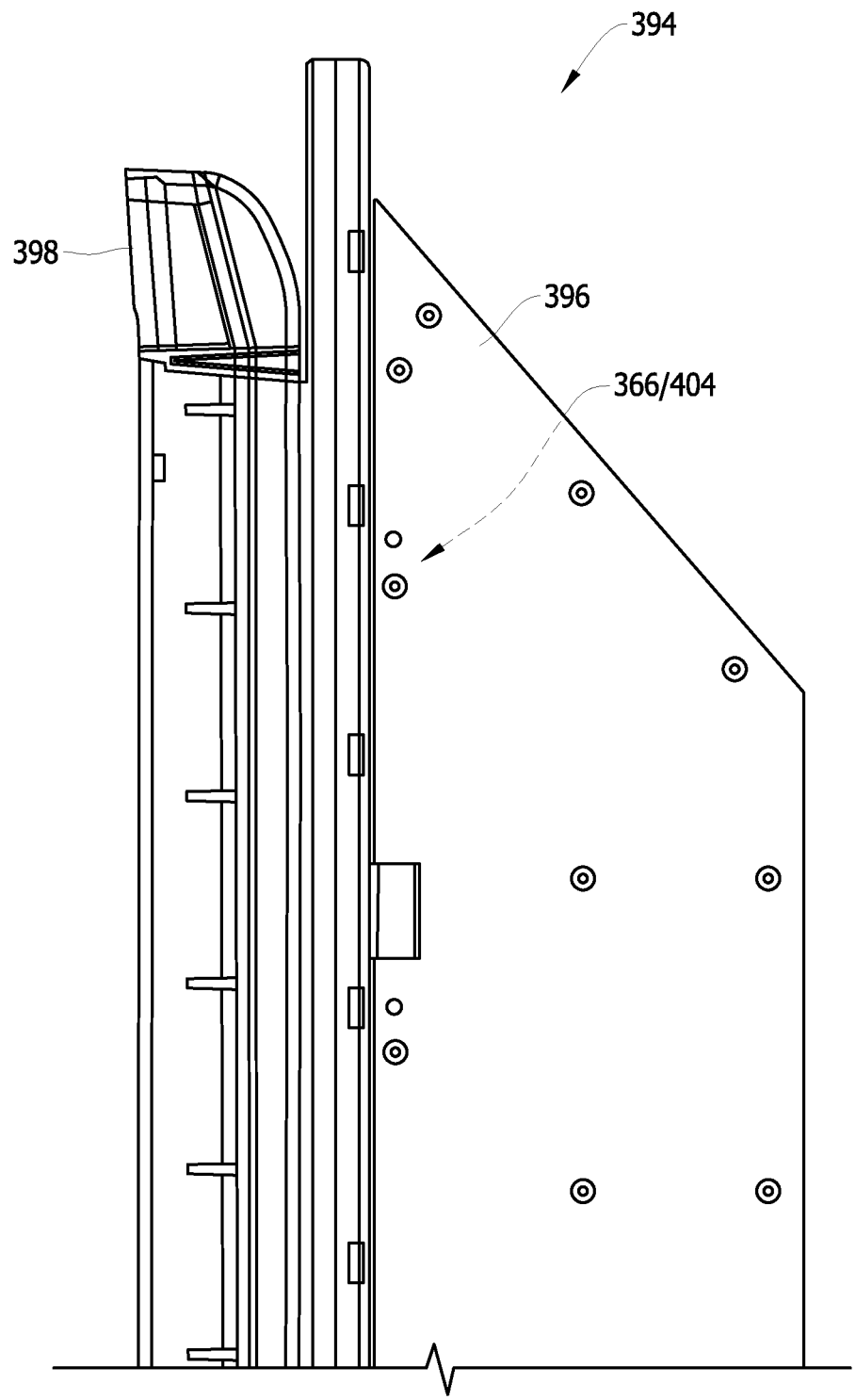
FIG. 14 is a side view of the cabinet assembly shown in FIG. 10.
Figure 15:
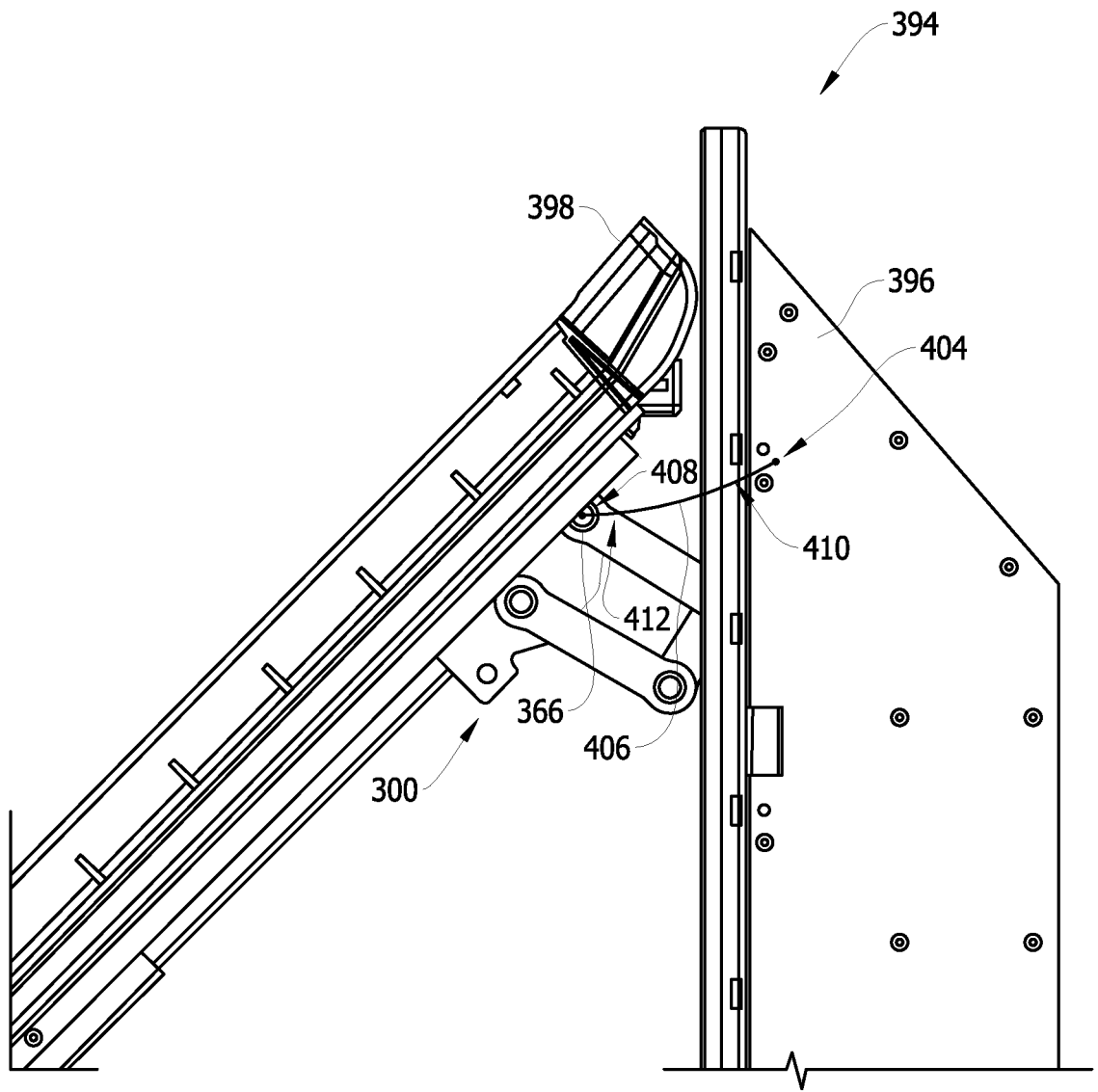
FIG. 15 is a side view of the cabinet assembly shown in FIG. 14 with the display shown in a partially open position.
Figure 16:
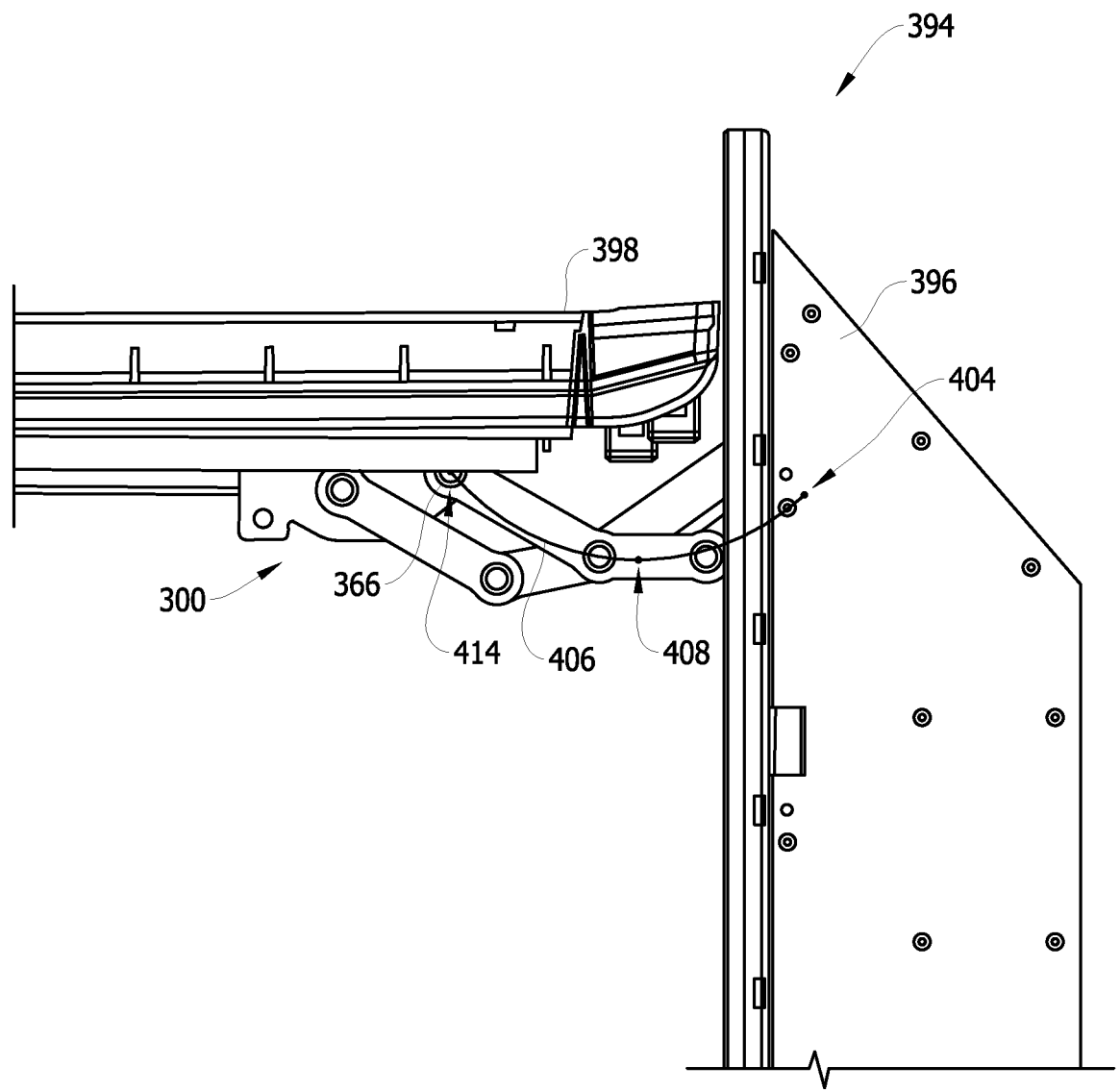
FIG. 16 is a side view of the cabinet assembly shown in FIG. 12.

FIGS. 14-16 are side views of cabinet assembly 394 being moved from a closed position to a fully open position. As described above, the range of motion of hinge assembly 300 may be defined by tracing the movement of at least one of the pivot points that are not connect to first bracket 310 (shown in FIG. 3) (i.e., mobile pivot points 362, 364, 366, 368, and 370). The range of motion of hinge assembly 300 will be discussed in the context of fifth pivot point 366, but it should be understood the discussion is applicable to the other mobile pivot points as well.

Referring to FIG. 14, hinge assembly 300 is in the fully retracted position. When hinge assembly 300 is in the fully retracted position, fifth pivot point 000 is positioned interior to cabinet frame 396, and defines a first end 404 of a range of motion (not shown in FIG. 14) of hinge assembly 300. Referring to FIG. 15, display screen 398 is in a partially open position, which is enabled by a range of motion 406 of hinge assembly 300. In one embodiment, range of motion 406 is parabolic in nature, and includes an apex 408 positioned exterior of cabinet frame 396. More specifically, or alternatively, range of motion 406 includes substantially linear component 410 and an arcuate component 412 positioned closer to apex 408 than substantially linear component 410. Arcuate component 412 has a radius of curvature that is greater than that of substantially linear component 410. As such, as shown in FIG. 16, hinge assembly 300 facilitates swinging display screen 398 to clear cabinet frame 396 as fifth pivot point 366 moves through range of motion 406 defined between first end 404 and a second end 414.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
   a cabinet;
   a display; and
   a hinge assembly coupled between the cabinet and the display, the hinge assembly comprising:
     a first bracket coupled to the cabinet;
     a second bracket coupled to the display; and
     at least four pairs of interdigitated members extending between the first bracket and the second bracket,
       wherein the hinge assembly is selectively expandable and retractable between a retracted position and an expanded position, and
       wherein the hinge assembly is configured to swing the display from a lowered position to a raised position as the hinge assembly is expanded from the retracted position to the expanded position.

2. The electronic gaming machine in accordance with claim 1, wherein the at least four pairs of interdigitated members define a plurality of mobile pivot points, and wherein when the hinge assembly is expanded from the retracted position to the expanded position, the plurality of mobile pivot points define a range of motion of the hinge assembly between the retracted position and the expanded position.

3. The electronic gaming machine in accordance with claim 2, wherein the range of motion defined by the plurality of mobile pivot points when the hinge assembly is expanded from the retracted position to the expanded position is downward and outward until an apex is reached and upward and outward beyond the apex.

4. The electronic gaming machine in accordance with claim 2, wherein the range of motion defined by the plurality of mobile pivot points when the hinge assembly is expanded from the retracted position to the expanded position is substantially parabolic.

5. The electronic gaming machine in accordance with claim 1, wherein the at least four pairs of interdigitated members comprise:
   a first link pair coupled to and extending from the first bracket at a first pivot point;
   a second link pair coupled to and extending from the first bracket at a second pivot point;
   a third link pair coupled to the first link pair at a third pivot point, coupled to the second link pair at a fourth pivot point, and coupled to the second bracket at a fifth pivot point; and
   a fourth link pair coupled to and extending from the second bracket at a sixth pivot point, and coupled to the second link pair at a seventh pivot point.

6. The electronic gaming machine in accordance with claim 1, wherein the display is orientable substantially vertically when the hinge assembly is in the retracted position, and is orientable substantially horizontally when the hinge assembly is in the expanded position.

7. The electronic gaming machine in accordance with claim 1, wherein the hinge assembly is configured to move the display in a parabolic range of motion between the retracted position and the expanded position.

8. The electronic gaming machine in accordance with claim 1, wherein the hinge assembly has a range of motion configured to progressively increase a distance between the first bracket and the second bracket as the hinge assembly is expanded from the fully retracted position to the fully expanded position.

9. A hinge assembly comprising:
   a first bracket configured to be coupled to a gaming machine cabinet;
   a second bracket configured to be coupled to a gaming machine display; and
   at least four pairs of interdigitated members extending between the first bracket and the second bracket,
      wherein the hinge assembly is selectively expandable and retractable between a retracted position and an expanded position, and
      wherein the hinge assembly is configured to swing the display from a lowered position to a raised position as the hinge assembly is expanded from the retracted position to the expanded position.

10. The hinge assembly in accordance with claim 9, wherein the at least four pairs of interdigitated members define a plurality of mobile pivot points, and wherein when the hinge assembly is expanded from the retracted position to the expanded position, the plurality of mobile pivot points define a range of motion of the hinge assembly between the retracted position and the expanded position.

11. The hinge assembly in accordance with claim 10, wherein the range of motion defined by the plurality of mobile pivot points when the hinge assembly is expanded from the retracted position to the expanded position is downward and outward until an apex is reached and upward and outward beyond the apex.

12. The hinge assembly in accordance with claim 10, wherein the range of motion defined by the plurality of mobile pivot points when the hinge assembly is expanded from the retracted position to the expanded position is substantially parabolic.

13. The hinge assembly in accordance with claim 9, wherein the at least four pairs of interdigitated members comprise:
   a first link pair coupled to and extending from the first bracket at a first pivot point;
   a second link pair coupled to and extending from the first bracket at a second pivot point;
   a third link pair coupled to the first link pair at a third pivot point, coupled to the second link pair at a fourth pivot point, and coupled to the second bracket at a fifth pivot point; and
   a fourth link pair coupled to and extending from the second bracket at a sixth pivot point, and coupled to the second link pair at a seventh pivot point.

14. The hinge assembly in accordance with claim 9, wherein the display is orientable substantially vertically when the hinge assembly is in the retracted position, and is orientable substantially horizontally when the hinge assembly is in the expanded position.

15. The hinge assembly in accordance with claim 9, wherein the hinge assembly is configured to move the display in a parabolic range of motion between the retracted position and the expanded position.

16. The hinge assembly in accordance with claim 9, wherein the hinge assembly has a range of motion configured to progressively increase a distance between the first bracket and the second bracket as the hinge assembly is expanded from the fully retracted position to the fully expanded position.

17. An electronic gaming machine comprising:
   a cabinet;
   a display; and
   a hinge assembly coupled between the cabinet and the display, the hinge assembly comprising:
      a first bracket coupled to the cabinet;
      a second bracket coupled to the display;
      a plurality of interdigitated members extending between the first bracket and the second bracket,
         wherein the hinge assembly is selectively expandable and retractable between a retracted position and an expanded position, and
         wherein the hinge assembly is configured to reposition the display between a first position and a second position as the hinge assembly is expanded from the retracted position to the expanded position.

18. The electronic gaming machine in accordance with claim 17, wherein the plurality of interdigitated members define a plurality of mobile pivot points, and wherein when the hinge assembly is expanded from the retracted position to the expanded position, the plurality of mobile pivot points define a parabolic range of motion of the hinge assembly between the retracted position and the expanded position.

19. The electronic gaming machine in accordance with claim 18, wherein the range of motion defined by the plurality of mobile pivot points when the hinge assembly is expanded from the retracted position to the expanded position is downward and outward until an apex is reached and upward and outward beyond the apex.

20. The electronic gaming machine in accordance with claim 17, wherein the display is orientable substantially vertically when the hinge assembly is in the retracted position, and is orientable substantially horizontally when the hinge assembly is in the expanded position.

\* \* \* \* \*